(12) United States Patent
Komura

(10) Patent No.: US 12,134,838 B2
(45) Date of Patent: Nov. 5, 2024

(54) CARBON FIBER AGGREGATE AND METHOD FOR PRODUCING SAME, AND ELECTRODE MIXTURE LAYER FOR NONAQUEOUS-ELECTROLYTE SECONDARY BATTERY

(71) Applicant: TEIJIN LIMITED, Osaka (JP)

(72) Inventor: Shinya Komura, Osaka (JP)

(73) Assignee: TEIJIN LIMITED, Osaka (JP)

( * ) Notice: Subject to any disclaimer, the term of this patent is extended or adjusted under 35 U.S.C. 154(b) by 732 days.

(21) Appl. No.: 17/270,954

(22) PCT Filed: Aug. 22, 2019

(86) PCT No.: PCT/JP2019/032896
§ 371 (c)(1),
(2) Date: Feb. 24, 2021

(87) PCT Pub. No.: WO2020/045243
PCT Pub. Date: Mar. 5, 2020

(65) Prior Publication Data
US 2021/0324545 A1    Oct. 21, 2021

(30) Foreign Application Priority Data

Aug. 27, 2018  (JP) ................................. 2018-158388

(51) Int. Cl.
| | | |
|---|---|---|
| *D01F 9/15* | (2006.01) | |
| *D01F 11/06* | (2006.01) | |
| *H01M 4/04* | (2006.01) | |
| *H01M 4/133* | (2010.01) | |

(52) U.S. Cl.
CPC ................ *D01F 9/15* (2013.01); *D01F 11/06* (2013.01); *H01M 4/0471* (2013.01); *H01M 4/133* (2013.01); *D10B 2101/12* (2013.01)

(58) Field of Classification Search
None
See application file for complete search history.

(56) References Cited

U.S. PATENT DOCUMENTS

| | | | |
|---|---|---|---|
| 5,436,092 A | 7/1995 | Ohtsuka et al. | |
| 5,556,723 A * | 9/1996 | Ohsaki | H01M 10/05 |
| | | | 429/232 |
| 2002/0177032 A1 | 11/2002 | Suenaga et al. | |
| 2007/0184348 A1 | 8/2007 | Sakurai et al. | |
| 2012/0214070 A1 | 8/2012 | Yamamoto et al. | |
| 2012/0214375 A1 | 8/2012 | Kitano et al. | |
| 2018/0282909 A1 | 10/2018 | Hirakawa et al. | |

FOREIGN PATENT DOCUMENTS

| | | |
|---|---|---|
| EP | 3 358 072 A1 | 8/2018 |
| EP | 3 412 818 A1 | 12/2018 |
| JP | 6-132032 A | 5/1994 |
| JP | 2003-200052 A | 7/2003 |
| JP | 2006-348401 A | 12/2006 |
| JP | 2012-188790 * | 10/2012 |
| JP | 2012-188790 A | 10/2012 |
| JP | 2015-048561 A | 3/2015 |
| JP | 2017-8429 A | 1/2017 |
| JP | 2017-066546 A | 4/2017 |
| JP | 2017-210705 A | 11/2017 |
| WO | 2005/087991 A1 | 9/2005 |
| WO | 2011/089754 A1 | 7/2011 |
| WO | 2012/111688 A1 | 8/2012 |
| WO | 2017/135406 A1 | 8/2017 |

OTHER PUBLICATIONS

International Search Report for PCT/JP2019/032896, dated Nov. 19, 2019.

* cited by examiner

*Primary Examiner* — Alix E Eggerding
(74) *Attorney, Agent, or Firm* — Sughrue Mion, PLLC

(57) ABSTRACT

With the present invention a carbon fiber aggregate is provided that has an average fiber diameter of 100-1000 nm, and a fiber diameter variation coefficient (CV value) greater than 0.5 and less than or equal to 1.0.

11 Claims, No Drawings

CARBON FIBER AGGREGATE AND METHOD FOR PRODUCING SAME, AND ELECTRODE MIXTURE LAYER FOR NONAQUEOUS-ELECTROLYTE SECONDARY BATTERY

CROSS REFERENCE TO RELATED APPLICATIONS

This application is a National Stage of International Application No. PCT/JP2019/032896 filed Aug. 22, 2019, claiming priority based on Japanese Patent Application No. 2018-158388 filed Aug. 27, 2018.

TECHNICAL FIELD

The present invention relates to a carbon fiber aggregate and a method for producing the carbon fiber aggregate, and an electrode mixture layer for a nonaqueous electrolyte secondary battery.

BACKGROUND ART

Carbon nanomaterials, especially, ultrafine carbon fibers with an average fiber diameter of 1 μm or less, have excellent properties such as high crystallinity, high electroconductivity, high strength, a high elastic modulus, and light weight, and are therefore used as nanofillers of high-performance composite materials. The application thereof is not limited to reinforcing nanofillers intended for improvement of mechanical strength, and by making use of high electroconductivity and high thermal conductivity of a carbon material, an attempt has been made to use these carbon nanomaterials as materials to be added to electrodes in various kinds of batteries and capacitors, electromagnetic wave shielding materials, electroconductive nanofillers for antistatic materials, nanofillers to be blended in electrostatic paints for resins, or materials to be added to heat dissipating materials. In addition, these carbon nanomaterials are expected to be used as electric field electron emission materials for flat displays and the like, by taking advantage of characteristics with regard to chemical stability, thermal stability, and microstructures as a carbon material.

Patent Literature 1 describes that composite fibers having a polyethylene ratio of 80% by weight and a pitch ratio of 20% by weight were sequentially stabilized, de-polyethylenated, and carbonized/graphitized to produce ultrafine carbon fibers. However, no mention is made of battery characteristics of a nonaqueous electrolyte secondary battery.

Patent Literature 2 discloses a pitch-based ultrafine carbon fiber having a high affinity for an electrolytic solution that is useful as a conductive auxiliary agent for a battery material. Moreover, it is described that the pitch-based ultrafine carbon fiber has a CV value of the fiber diameter of 10 to 50% (coefficient of variation 0.1 to 0.5) and the fiber diameter varies moderately in this range, so that contact properties with an electrode active material having various fiber diameters can be increased in an electrode mixture layer, and performance as a conductive auxiliary agent is improved. However, it is not stated for a packing property of the active material and the conductive auxiliary agent in the electrode mixture layer.

Patent Literature 3 discloses a pitch-based carbon fiber produced from a composite fiber containing a polyvinyl alcohol-based polymer as a sea component and a pitch as an island component as a raw material. This carbon fiber has a CV value of the fiber diameter of 0 to 10%, and the fiber diameter is uniform. It is stated that when the fiber diameters vary, there are problems such as uneven density and local bias in characteristics such as conductive performance (paragraph 0008).

CITATION LIST

Patent Literature

Patent Literature 1: JP 2017-210705 A
Patent Literature 2: JP 2017-66546 A
Patent Literature 3: JP 2015-048561 A

SUMMARY OF INVENTION

Technical Problem

The pitch-based ultrafine carbon fiber described in Patent Literature 2 has a small CV value of the fiber diameter of 10 to 50%. That is, it can be said that the fiber diameters are relatively uniform. Therefore, when this pitch-based ultrafine carbon fiber is used in the electrode mixture layer for a nonaqueous electrolyte secondary battery, it is difficult for the carbon fiber to be efficiently arranged in gaps formed by active material particles. Therefore, it is expected that it will be difficult to increase a density and packing of the electrode mixture layer containing the active material particles and the pitch-based ultrafine carbon fibers.

An object of the present invention is to provide a carbon fiber aggregate capable of exhibiting high battery performance and having a form capable of increasing packing density.

Solution to Problem

As a result of diligent studies in view of the prior art mentioned above, the present inventors have found that a carbon fiber aggregate having a predetermined fiber diameter distribution can increase packing density, and then achieved the present invention.

More specifically, the present invention for solving the above problems is described below.

[1] A carbon fiber aggregate with an average fiber diameter of 100 to 1000 nm and a coefficient of variation (CV value) of the fiber diameter of greater than 0.50 and 1.0 or less.

[2] The carbon fiber aggregate according to [1], wherein the carbon fiber aggregate has a crystallite spacing (d002) in accordance with an X-ray diffraction method of 0.3400 nm or more.

[3] The carbon fiber aggregate according to [1] or [2], which has a tap density of 0.020 to 0.100 g/cm$^3$.

[4] The carbon fiber aggregate according to [3], wherein a bulk density measured in a pressurized state at a pressure of 3.0 kg/cm$^2$ is 5.0 to 30 times the tap density.

[5] The carbon fiber aggregate according to [1], wherein powder volume resistivity A (Ω·cm) when packed with a packing density of 1.5 g/cm$^3$ is 7.0 to 20% of powder volume resistivity B (Ω·cm) when packed with a packing density of 0.50 g/cm$^3$.

[6] The carbon fiber aggregate according to [1], wherein a bulk density measured in a pressurized state at a pressure of 1.5 kg/cm$^2$ is 2.0 to 15 times the tap density.

[7] An electrode mixture layer for a nonaqueous electrolyte secondary battery, containing the carbon fiber aggregate according to any of [1] to [6], and an electrode active material.

[8] A method for producing the carbon fiber aggregate according to any of [1] to [6], including:
(1) a fiberizing step of forming a resin composition composed of a thermoplastic resin and 30 to 150 parts by mass of a mesophase pitch based on 100 parts by mass of the thermoplastic resin, in a molten state, thereby fiberizing the mesophase pitch to obtain a resin composite fiber;
(2) a stabilizing step of stabilizing the resin composite fiber to obtain a resin composite stabilized fiber;
(3) a thermoplastic resin removing step of removing the thermoplastic resin from the resin composite stabilized fiber to obtain a stabilized fiber; and
(4) a carbonizing and firing step of heating the stabilized fiber under an inert atmosphere for carbonization or graphitization to obtain a carbon fiber aggregate.

Advantageous Effects of Invention

Since the carbon fiber aggregate of the present invention has an average fiber diameter of 100 to 1000 nm and has a wide fiber diameter distribution with a CV value of the fiber diameter of greater than 0.50 to 1.0, it is possible to increase packing density of an electrode mixture layer. Therefore, it is useful as various conductive auxiliary agents. In particular, when used in an electrode mixture layer for a nonaqueous electrolyte secondary battery, it can be efficiently arranged in gaps formed by active material particles. Therefore, a larger amount of active material particles can be contained in the electrode mixture layer, high-density packing is possible, and a nonaqueous electrolyte secondary battery having a large energy capacity per volume can be obtained. In addition, a large amount of carbon fibers can be mixed without reducing the amount of the active material, which contributes to increasing electron conductivity of the active material and further improving life characteristics.

DESCRIPTION OF EMBODIMENTS

Hereinafter, the present invention will be described.
1. Properties of Carbon Fiber Aggregate The carbon fiber aggregate of the present invention has an average fiber diameter of 100 to 1000 nm and a CV value of the fiber diameter of greater than 0.50 to 1.0. That is, the fiber diameter distribution is wide. Therefore, a thick conductive path is formed by carbon fibers having a large fiber diameter, and further, carbon fibers having a small fiber diameter can enter small gaps into which such carbon fibers cannot enter, and a further conductive path can be formed.

The average fiber diameter of the carbon fiber aggregate of the present invention is 100 to 1000 nm. The upper limit is preferably 900 nm or less, more preferably 800 nm or less, further preferably 600 nm or less, still further preferably 500 nm or less, still further preferably 400 nm or less, and even further preferably 300 nm or less. The lower limit is preferably 110 nm or more, more preferably 120 nm or more, further preferably 150 nm or more, further preferably 200 nm or more, and particularly preferably greater than 200 nm.

A carbon fiber aggregate with an average fiber diameter of less than 100 nm is very low in bulk density, and inferior in handling ability. Further, when a carbon fiber aggregate with an average fiber diameter of greater than 1000 nm, it is difficult to increase electrode density when used as an electrode material.

Here, the fiber diameter of the carbon fiber in the present invention means a value measured from a photographic picture of a cross section or surface of the carbon fiber taken at a magnification of 1,000 times using a field emission type scanning electron microscope. The average fiber diameter of carbon fibers is determined by measuring fiber diameters at 300 spots randomly selected in the obtained electron micrograph, and calculating the average value of all the measurement results thereof (n=300).

The carbon fiber aggregate of the present invention has a coefficient of variation (CV value) of the fiber diameter of greater than 0.50 and 1.0 or less. The coefficient of variation is preferably greater than 0.50, and more preferably 0.51 or more. The coefficient of variation is preferably 0.90 or less, and further preferably 0.80 or less. When the coefficient of variation is in this range, the fiber diameter is widely distributed and the packing density can be increased. When the coefficient of variation exceeds 1.0, the fiber diameter distribution is too wide and it is difficult to highly control battery performance when used as a battery material. On the other hand, when a carbon fiber aggregate having a coefficient of variation of 0.50 or less is used in the electrode mixture layer for a nonaqueous electrolyte secondary battery, it is difficult to efficiently arrange it in gaps formed by the active material particles, and it becomes difficult to increase the packing density.

In the present invention, the coefficient of variation is a value obtained by dividing a standard deviation of the fiber diameter of carbon fibers by the average fiber diameter. The method for measuring the fiber diameter is as described above.

The carbon fibers constituting the carbon fiber aggregate of the present invention has a distance (d002) between adjacent graphite sheets measured by wide-angle X-ray measurement of preferably 0.3400 nm or more, more preferably 0.3410 nm or more, and further preferably 0.3420 nm or more. Further, d002 is preferably 0.3450 nm or less, and more preferably 0.3445 nm or less. When d002 is 0.3400 nm or more, the carbon fiber is less likely to become brittle. Therefore, at the time of processing such as disintegration and preparation of kneaded slurry, the fiber is less likely to be broken, and fiber length is maintained. As a result, formation of long-distance conductive paths is facilitated. In addition, the conductive path is easily maintained by following a volume change of the active material due to charge/discharge of a lithium ion secondary battery. However, depending on the application, (d002) is preferably 0.3350 to 0.3400 nm, and more preferably 0.3350 to 0.3390 nm. By being in the range of 0.3350 to 0.3400 nm, the carbon fiber has high graphite crystallinity, and excellent oxidation resistance.

The carbon fiber aggregate of the present invention has a tap density of preferably 0.020 to 0.100 g/cm$^3$. When a carbon fiber aggregate having a low tap density is used in the electrode mixture layer for a nonaqueous electrolyte secondary battery, it may be difficult to increase a packing ratio in the electrode mixture layer. The lower limit of the tap density is more preferably 0.030 g/cm$^3$, and further preferably 0.035 g/cm$^3$. Further, from the viewpoint of increasing charge density in the electrode mixture layer, a high tap density is preferable, but when the tap density is too high, dispersibility in an electrode is expected to be low, which is not preferable. The upper limit of the tap density is more preferably 0.080 g/cm$^3$. Since the carbon fiber aggregate of the present invention has a wide fiber diameter distribution, carbon fibers having a small fiber diameter can enter gaps between fibers of carbon fibers having a large fiber diameter, and the tap density can be increased.

Since the carbon fiber aggregate of the present invention has a wide fiber diameter distribution, the packing ratio of carbon fibers in the electrode mixture layer can be increased. That is, the carbon fiber aggregate can be highly compressed even by a low pressure. Therefore, even if the carbon fiber aggregate is compressed, buckling fracture of the carbon fiber is less likely to occur. Specifically, the bulk density measured in a pressurized state at a pressure of 3.0 kg/cm$^2$ can be 5.0 to 30 times the above-mentioned tap density. When the bulk density is less than 5.0 times the above-mentioned tap density, it becomes difficult to increase the electrode density by pressing during electrode formation. Moreover, when the bulk density exceeds 30 times the above-mentioned tap density, it is presumed that the carbon fibers are destroyed. Therefore, the carbon fibers are easily destroyed by the pressing during electrode formation. Thus, it is difficult to form a long-distance conductive path in the electrode mixture layer. The bulk density is preferably 6.0 to 25 times and more preferably 6.0 to 20 times the above-mentioned tap density.

In the carbon fiber aggregate of the present invention, a bulk density measured in a pressurized state at a pressure of 1.5 kg/cm$^2$ is preferably 2.0 to 15 times the above-mentioned tap density. The bulk density is preferably 3.0 to 12 times and more preferably 5.0 to 10 times the above-mentioned tap density.

When the carbon fiber aggregate of the present invention is used as a conductive auxiliary agent for the electrode mixture layer, it is preferable that conductivity is exhibited in a low bulk density state, and powder volume resistivity A (Ω·cm) when packed with a packing density of 1.5 g/cm$^3$ is preferably 7 to 20% of powder volume resistivity B (Ω·cm) when packed with a packing density of 0.50 g/cm$^3$. It is more preferably 7 to 15%.

The average fiber length of the carbon fiber aggregate of the present invention is preferably 10 μm or more. When the average fiber length is less than 10 μm, conductivity in the electrode mixture layer, strength of the electrode, and electrolyte liquid retention properties may be lowered. Further, when the average fiber length exceeds 30 μm, dispersibility of individual carbon fibers is likely to be impaired. That is, when the carbon fibers are too long, the individual carbon fibers tend to be oriented in an in-plane direction of the electrode mixture layer. As a result, it is difficult to form a conductive path in the film thickness direction of the electrode mixture layer.

The average fiber length is preferably 10 to 30 μm, and more preferably 12 to 28 μm.

The CV value of the fiber length of the carbon fiber aggregate of the present invention is preferably 1.0 to 1.3, and more preferably 1.0 to 1.2. When the CV value is larger than 1.3, the dispersibility of individual carbon fibers is likely to be impaired.

The carbon fiber aggregate of the present invention is preferably a carbon fiber having no branched structure from the viewpoint of ability to form a conductive network in the electrode mixture layer, improvement of battery output, and improvement of battery durability. The carbon fibers also include vapor-grown carbon materials such as carbon nanotubes and carbon nanoribbons, and the vapor-grown carbon fibers may have a branched structure. Since the carbon fibers produced by melt spinning method do not have a branched structure, they are excellent in handleability and dispersibility. Above all, when it is preferable that the carbon material has high crystallinity, pitch-based carbon fibers are preferable to PAN-based carbon fibers.

The carbon fiber constituting the carbon fiber aggregate of the present invention is not particularly limited, but as described above, it is preferable that the carbon fiber has a linear structure having substantially no branching. Branching refers to the facts that the main axis of carbon fiber is branched midway, and that the main axis of carbon fiber has a branched secondary axis. The linear structure with substantially no branching means that the degree of branching of the carbon fiber is 0.01 pieces/μm or less. As the carbon fiber having a branched structure, for example, a vapor phase grown carbon fiber produced by a vapor phase method in which hydrocarbon such as benzene is vaporized in a high temperature atmosphere in the presence of iron as a catalyst (for example, VGCF (registered trademark) manufactured by Showa Denko K.K.) is known.

The carbon fibers constituting the carbon fiber aggregate of the present invention may be hollow (tubular) or porous, but it is preferable to pass through a resin composite fiber in the process of producing the carbon fiber. Therefore, the carbon fiber of the present invention is substantially solid, and the surface is basically smooth.

The carbon fibers constituting the carbon fiber aggregate of the present invention may be in a fibrous form as a whole, and examples also include carbon fibers of less than 1 μm which come into contact with each other or are combined with each other to integrally form a fiber shape (for example, those in which spherical carbon is connected in a beaded form by fusion or the like, those in which a plurality of extremely short fibers is combined by fusion or the like, and the like). Further, examples also includes carbon fibers obtained by reducing fiber diameter by grinding carbon fibers having a large fiber diameter with an average fiber diameter of greater than 1000 μm, or the like.

The carbon fibers constituting the carbon fiber aggregate of the present invention have a thickness (Lc) of graphene (net plane group) of preferably 130 nm or less, more preferably 50 nm or less, further preferably 20 nm or less, and still further preferably 10 nm or less, as measured by an X-ray diffraction method. However, when it is less than 1.0 nm, conductivity of carbon fiber is significantly lowered, which is not preferable depending on the application.

In the present invention, the crystallite size (Lc) measured by the X-ray diffraction method refers to a value measured in accordance with Japanese Industrial Standard JIS R 7651 (2007 edition) "Measurement of lattice parameters and crystallite sizes of carbon materials".

In the carbon fibers constituting the carbon fiber aggregate of the present invention, the content ratio of metal elements is 50 ppm or less, more preferably 30 ppm or less, and further preferably 20 ppm or less in total. When the content ratio of metal elements exceeds 50 ppm, a catalytic action of the metal makes the battery more likely to be deteriorated. In the present invention, the content ratio of metal elements means a total content ratio of Li, Na, Ti, Mn, Fe, Ni, and Co. In particular, the content ratio of Fe is preferably 5 ppm or less, more preferably 3 ppm or less, and further preferably 1 ppm or less. When the content ratio of Fe exceeds 5 ppm, the battery is particularly made more likely to be deteriorated, which is not preferable.

In the carbon fibers constituting the carbon fiber aggregate of the present invention, hydrogen, nitrogen, and ash are all preferably 0.5% by mass or less, and more preferably 0.3% by mass or less. When hydrogen, nitrogen, and ash in the carbon fibers are all 0.5% by mass or less, structural defects of a graphite layer are further suppressed, and side reactions in the battery can be suppressed, which is preferable.

It is preferable that the carbon fibers constituting the carbon fiber aggregate of the present invention substantially do not contain boron. When a boron atom bonded to a carbon atom is present on a surface of a fibrous carbon, the boron atom may be an active point and cause a decomposition reaction of a battery electrolyte. Here, the phrase "substantially do not contain" refers to the fact that the boron content ratio is 1 mass ppm or less.

2. Method for Producing Carbon Fiber Aggregate

Hereinafter, the method for producing the carbon fiber aggregate of the present invention will be described.

The carbon fiber aggregate of the present invention is preferably a pitch-based carbon fiber aggregate. Hereinafter, an example of a method for producing a pitch-based carbon fiber aggregate will be described. The method for producing a pitch-based carbon fiber aggregate according to the present invention goes through steps (1) to (4) described below.

(1) a fiberizing step of forming a mesophase pitch resin composition composed of a thermoplastic resin and 30 to 150 parts by mass of a mesophase pitch based on 100 parts by mass of the thermoplastic resin in a molten state, thereby fiberizing the mesophase pitch to obtain a resin composite fiber;

(2) a stabilizing step of stabilizing the obtained resin composite fiber to obtain a resin composite stabilized fiber;

(3) a thermoplastic resin removing step of removing the thermoplastic resin from the obtained resin composite stabilized fiber to obtain a stabilized fiber; and (4) a carbonizing and firing step of heating the obtained stabilized fiber under an inert atmosphere for carbonization or graphitization to obtain a carbon fiber aggregate.

(1) Fiberizing Step

In the fiberizing step, a mesophase pitch composition composed of a thermoplastic resin and 25 to 150 parts by mass of a mesophase pitch based on 100 parts by mass of the thermoplastic resin is formed in a molten state. As a result, a resin composite fiber containing a fiberized mesophase pitch inside is obtained.

<Thermoplastic Resin>

The thermoplastic resin to be used in the method for producing a carbon fiber aggregate according to the present invention needs to be easily removed in the thermoplastic resin removing step after the resin composite fiber is produced. Examples of the thermoplastic resin include polyolefins, polyacrylate-based polymers such as polymethacrylate and polymethyl methacrylate, polystyrene, polycarbonate, polyarylate, polyester, polyamide, polyester carbonate, polysulfone, polyimide, polyetherimide, polyketone, and polylactic acid. Among them, polyolefins are preferably used.

Specific examples of the polyolefin include polyethylene, polypropylene, poly-4-methylpentene-1, and copolymers containing these polymers. From the viewpoint of easy removal in the thermoplastic resin removing step, polyethylene is preferably used. Examples of the polyethylene include homopolymers such as high-pressure low-density polyethylene, low-density polyethylene such as gas-phase/solution/high-pressure linear low-density polyethylene, medium-density polyethylene, and high-density polyethylene; or copolymers of ethylene and other vinyl-based monomer such as copolymers of ethylene and an α-olefin and ethylene-vinyl acetate copolymers.

The thermoplastic resin for use in the present invention preferably has a melt mass flow rate (MFR) of preferably 0.1 to 10 g/10 min, more preferably 0.1 to 5 g/10 min, and particularly preferably 0.1 to 3 g/10 min, as measured in accordance with JIS K 7210 (1999). When the MFR is in the above range, a carbon precursor can be favorably microdispersed in the thermoplastic resin. In addition, in molding of the resin composite fiber, the fiber (carbon precursor) is stretched, so that the fiber diameter of the resulting carbon fiber can be further reduced. The thermoplastic resin for use in the present invention has a glass transition temperature of preferably 250° C. or less when being amorphous, and a melting point of preferably 300° C. or less when being crystalline, in that the thermoplastic resin can be easily melt-kneaded with the carbon precursor.

<Carbon Precursor>

It is preferable to use a mesophase pitch as the carbon precursor. Hereinafter, a case where a mesophase pitch is used as the carbon precursor will be described. The mesophase pitch is a pitch capable of forming an optically anisotropic phase (liquid crystal phase) in a molten state. Examples of the mesophase pitch for use in the present invention include those obtained using a distillation residue of coal or petroleum as a raw material, and those obtained using an aromatic hydrocarbon such as naphthalene as a raw material. For example, a mesophase pitch derived from coal is obtained by a treatment mainly including hydrogenation/heat treatment of coal tar pitch; a treatment mainly including hydrogenation/heat treatment/solvent extraction; or the like.

More specifically, a mesophase pitch may be obtained by the following method.

First, a coal tar pitch freed of a quinoline-insoluble component and with a softening point of 80° C. is hydrogenated at a pressure of 13 MPa and a temperature of 340° C. in the presence of a Ni—Mo based catalyst to obtain a hydrogenated coal tar pitch. The hydrogenated coal tar pitch is heat-treated at 480° C. under atmospheric pressure and then decompressed to remove a low-boiling-point component to obtain a crude mesophase pitch. The crude mesophase pitch is filtered using a filter to remove foreign matters at a temperature of 340° C., whereby a purified mesophase pitch may be obtained.

The optical anisotropy content (mesophase ratio) of the mesophase pitch is preferably 80% or more, and more preferably 90% or more.

In addition, the mesophase pitch has a softening point of preferably 100 to 400° C., and more preferably 150 to 350° C.

<Resin Composition>

Preferably, a resin composition (hereinafter, also referred to as "a mesophase pitch composition") composed of a thermoplastic resin and a mesophase pitch, which is used in the method for producing a carbon fiber aggregate according to the present invention, contains 30 to 150 parts by mass of the mesophase pitch based on 100 parts by mass of the thermoplastic resin. The content of the mesophase pitch is more preferably 35 to 150 parts by mass, and still further preferably 40 to 100 parts by mass. When the content of the mesophase pitch exceeds 150 parts by mass, the fiber diameter of the carbon fibers constituting the carbon fiber aggregate increases, and carbon fibers having a desired fiber diameter cannot be obtained. When the content of the mesophase pitch is less than 30 parts by mass, dispersion diameter distribution of the mesophase pitch becomes narrow, and as a result, the fiber diameter distribution of the finally obtained carbon fiber becomes small.

For manufacturing a carbon fiber with a fiber diameter of less than 1000 nm, the dispersion diameter of the mesophase pitch in the thermoplastic resin is preferably 0.01 to 50 μm, and more preferably 0.01 to 30 μm. When the dispersion diameter of the mesophase pitch in the thermoplastic resin deviates from the range of 0.01 to 50 μm, it may be difficult to manufacture a desired carbon fiber. In the mesophase pitch composition, the mesophase pitch forms a spherical or elliptical island component. The dispersion diameter in the present invention means, when the island component has a spherical shape, a diameter thereof and means, when the island component has an elliptical shape, a major axis thereof.

The dispersion diameter of mesophase pitch is kept preferably after the mesophase pitch composition is held at 300° C. for 3 minutes, more preferably after held at 300° C. for 5 minutes, and particularly preferably after held at 300° C. for 10 minutes. In general, when a mesophase pitch composition is held in a molten state, the mesophase pitch is aggregated in the thermoplastic resin with the lapse of time. When the mesophase pitch is aggregated and the dispersion diameter thereof exceeds 50 µm, it may be difficult to manufacture a desired carbon fiber. The aggregation rate of the mesophase pitch in the thermoplastic resin varies depending on the types of thermoplastic resin and mesophase pitch to be used.

The mesophase pitch composition may be manufactured by kneading the thermoplastic resin and the mesophase pitch in a molten state. Melt-kneading of the thermoplastic resin and the mesophase pitch may be carried out using a known apparatus. For example, one or more selected from the group consisting of a single-screw kneader, a twin-screw kneader, a mixing roll, and a Banbury mixer may be used. Among them, for the purpose of favorably micro-dispersing the mesophase pitch in the thermoplastic resin, it is preferable to use a twin-screw kneader, and it is particularly preferable to use a twin-screw kneader in which each shaft is rotated in the same direction.

The kneading temperature is not particularly limited as long as the thermoplastic resin and the mesophase pitch are in a molten state, and it is preferably 100 to 400° C., and preferably 150 to 350° C. When the kneading temperature is lower than 100° C., the mesophase pitch does not become molten state, and it is difficult to micro-disperse the mesophase pitch in the thermoplastic resin. On the other hand, when it exceeds 400° C., decomposition of the thermoplastic resin and mesophase pitch progress. In addition, the melt-kneading time is preferably 0.5 to 20 minutes, and more preferably 1 to 15 minutes. When the melt-kneading time is less than 0.5 minutes, it is difficult to micro-disperse the mesophase pitch. On the other hand, when it exceeds 20 minutes, productivity of the carbon fiber aggregate is lowered.

Melt-kneading is carried out preferably under an inert atmosphere having an oxygen gas content of less than 10% by volume, more preferably under an inert atmosphere having an oxygen gas content of less than 5% by volume, and particularly preferably under an inert atmosphere having an oxygen gas content of less than 1% by volume. The mesophase pitch for use in the present invention may be denatured by contacting oxygen during melt-kneading to hinder micro-dispersion into the thermoplastic resin. Therefore, it is preferable to perform melt-kneading under an inert atmosphere to suppress a reaction between oxygen and the mesophase pitch.

<Resin Composite Fiber>

As a method for producing a resin composite fiber from the above-mentioned mesophase pitch composition, a method of melt-spinning the mesophase pitch composition from a spinneret may be exemplified. As a result, initial orientation of the mesophase pitch contained in the resin composite fiber can be enhanced.

When the mesophase pitch composition is melt-spun from a spinneret, the number of spinning holes in the spinneret is the number of fibers in the fiber bundle as it is. The number of fibers is preferably 100 to 3000, more preferably 200 to 2000, and further preferably 300 to 1500. When the number is less than 100, productivity is lowered, and when the number exceeds 3000, process stability is likely to decrease.

The average single yarn diameter of the resin composite fiber thus obtained is 10 to 200 µm. The lower limit of the average fiber diameter is preferably 50 µm or more, more preferably 70 µm or more, and further preferably 80 µm or more. The upper limit of the average fiber diameter is preferably 150 µm or less, more preferably 130 µm or less, and further preferably 120 µm or less. When it exceeds 200 µm, it is difficult for reactive gas to come into contact with the mesophase pitch dispersed inside the resin composite fiber during a stabilization step described later. Therefore, productivity is lowered. On the other hand, when it is less than 10 µm, strength of the resin composite fiber may decrease, so that process stability may decrease.

The temperature at the time of producing the resin composite fiber from the mesophase pitch composition is required to be higher than the melting temperature of the mesophase pitch, and is preferably 150 to 400° C., and more preferably 180 to 350° C. When it exceeds 400° C., the deformation relaxation rate of the mesophase pitch increases, so that it is difficult to maintain the shape of a fiber.

A draft ratio, which is a ratio of discharge line speed to take-up speed, is preferably 2 to 50, more preferably 2.5 to 30, further preferably 3 to 20, and particularly preferably more than 3 and 18 or less. When it is more than 50, deformation of the mesophase pitch cannot follow, and thus the mesophase pitch cannot be deformed into a fibrous form, which is not preferable. When it is less than 2, the molecular orientation property of the mesophase pitch cannot be enhanced, and as a result, crystallinity of the resulting fibrous carbon is reduced.

By changing the temperature at the time of producing the above-mentioned resin composite fiber and the draft ratio, the resin composite fiber can be stably molded, and the fiber diameter and the molecular orientation of the mesophase pitch can be controlled. As a result, the fiber diameter and crystallinity of a finally obtained carbon fiber aggregate can be adjusted.

In addition, the process for producing a resin composite fiber may include a cooling step. As a cooling step, for example, in the case of melt spinning, there is a method in which the atmosphere downstream of the spinneret is cooled. By providing the cooling step, a region where the mesophase pitch is deformed by extension can be adjusted, and the rate of strain can be adjusted. In addition, by providing the cooling step, the resin composite fiber after spinning is immediately cooled and solidified to enable stable molding.

The resin composite fiber obtained through these steps is fiberized with the mesophase pitch microdispersed in the thermoplastic resin at the time of kneading.

(2) Stabilizing Step

<Resin Composite Stabilized Fiber>

A resin composite stabilized fiber is produced by stabilizing (infusibilizing) the mesophase pitch fiber contained in the above-mentioned resin composite fiber.

The stabilization may be carried out by a known method such as a gas flow treatment using air, oxygen, ozone, nitrogen dioxide, a halogen, or the like, and a solution treatment using an acidic aqueous solution or the like. Stabilization by a gas flow treatment is preferable in terms of productivity.

As a gas component to be used, air, oxygen, or a mixed gas containing air and oxygen is preferable in terms of ease of handling, and use of air is particularly preferable in terms of cost. The concentration of an oxygen gas to be used is preferably in the range of 10 to 100% by volume of the total gas composition. When the oxygen gas concentration is less than 10% by volume of the total gas composition, a large amount of time is required to stabilize the mesophase pitch contained in the resin composite fiber.

The reaction temperature for stabilization is preferably 50 to 350° C., more preferably 60 to 300° C., further preferably 100 to 300° C., and particularly preferably 200 to 300° C. The treatment time for stabilization is preferably 10 to 1200 minutes, more preferably 10 to 600 minutes, further preferably 30 to 300 minutes, and particularly preferably 60 to 210 minutes.

The softening point of the mesophase pitch is markedly increased by the stabilization treatment. For the purpose of obtaining a desired carbon fiber, the softening point of the mesophase pitch is set to preferably 400° C. or more, and further preferably 500° C. or more.

(3) Thermoplastic Resin Removing Step

The thermoplastic resin contained in the resin composite stabilized fiber obtained as described above is removed to separate the stabilized fiber. In this step, the thermoplastic resin is decomposed and removed while thermal decomposition of the stabilized fiber is suppressed. Examples of a method for decomposing and removing the thermoplastic resin include a method of removing the thermoplastic resin using a solvent and a method of removing the thermoplastic resin by thermal decomposition. Of these, the method of removing with a solvent requires a large amount of solvent and also requires recovery, which increases process cost. Therefore, the latter removal by thermal decomposition is realistic and preferable.

Thermal decomposition of the thermoplastic resin is preferably carried out under an inert gas atmosphere. The inert gas atmosphere herein refers to a gas atmosphere of carbon dioxide, nitrogen, argon, or the like. The oxygen concentration thereof is preferably 30 ppm by volume or less, and more preferably 20 ppm by volume or less. As the inert gas to be used in this step, carbon dioxide and nitrogen are preferably used in terms of cost, and nitrogen is particularly preferably used.

When the thermoplastic resin is removed by thermal decomposition, it may also be performed under reduced pressure. By carrying out thermal decomposition under a reduced pressure, the thermoplastic resin can be sufficiently removed. As a result, fusion between carbon fibers or graphitized fibers obtained by carbonizing or graphitizing the stabilized fiber can be reduced. The atmospheric pressure is preferably as low as possible, and is preferably 50 kPa or less, more preferably 30 kPa or less, further preferably 10 kPa or less, and particularly preferably 5 kPa or less. On the other hand, since it is difficult to achieve perfect vacuum, the lower limit of the pressure is generally 0.01 kPa or more.

When the thermoplastic resin is removed by thermal decomposition, a very small amount of oxygen and an inert gas may be present as long as the atmosphere pressure is maintained. Particularly, it is preferable that a very small amount of an inert gas is present because fusion between fibers due to thermal deterioration of the thermoplastic resin is advantageously suppressed. The very small amount of oxygen herein refers to the fact that the oxygen concentration is 30 ppm by volume or less, and the very small amount of an inert gas atmosphere herein refers to the fact that the inert gas concentration is 20 ppm by volume or less. The type of inert gas to be used is as described above.

The thermal decomposition temperature is preferably 350 to 600° C., and more preferably 380 to 550° C. When the thermal decomposition temperature is less than 350° C., thermal decomposition of the stabilized fiber can be suppressed, but thermal decomposition of the thermoplastic resin cannot be sufficiently performed in some cases. On the other hand, when it exceeds 600° C., thermal decomposition of the thermoplastic resin can be sufficiently performed, but the stabilized fiber is thermally decomposed in some cases, and as a result, the yield at carbonization is likely to decrease. The thermal decomposition time is preferably 0.1 to 10 hours, and more preferably 0.5 to 10 hours.

In the manufacturing method of the present invention, it is preferable that the stabilization step and the thermoplastic resin removing step are carried out with the resin composite fiber or resin composite stabilized fiber held on a support base material in a basis weight of 2 kg/m$^2$ or less. By holding on the support base material, it is possible to suppress aggregation of the resin composite fiber or the resin composite stabilized fiber by heat treatment at the time of the stabilization treatment or removal of the thermoplastic resin, and to maintain air permeability.

As a material of the support base material, it is necessary that deformation and corrosion are not caused by a solvent or heating. In addition, the heat-resistant temperature of the support base material is preferably 600° C. or more since it is necessary not to be deformed at a thermal decomposition temperature in the thermoplastic resin removing step. Examples of the material may include metallic materials such as stainless steel, and ceramic materials such as alumina and silica.

The shape of the support base material is preferably a shape having air permeability in a direction perpendicular to the surface. A mesh structure is preferable as such a shape. The aperture of the mesh is preferably 0.1 to 5 mm. When the aperture is more than 5 mm, fibers may be easily aggregated on a mesh line by heating treatment, leading to insufficient stabilization of the mesophase pitch and removal of the thermoplastic resin, which is not preferable. On the other hand, when the aperture of the mesh is less than 0.1 mm, the permeability in the direction perpendicular to the surface of the support base material may be reduced due to a decrease in porosity of the support base material, which is not preferable.

(4) Carbonizing and Firing Step

By carbonizing and/or graphitizing the stabilized fiber under an inert gas atmosphere, the carbon fiber aggregate of the present invention is obtained. As a container to be used here, a crucible-like container made of graphite is preferable. Here, carbonization refers to heating at a relatively low temperature (preferably about 1000° C.), and graphitization refers to growing graphite crystals by heating at a higher temperature (preferably about 3000° C.).

Examples of the inert gas to be used for carbonization and/or graphitization of the stabilized fiber include nitrogen, argon, and the like. The concentration of oxygen in the inert gas is preferably 20 ppm by volume or less, and more preferably 10 ppm by volume or less. The firing temperature during carbonization and/or graphitization is preferably 500 to 3500° C., and more preferably 800 to 3200° C. In particular, the firing temperature at the time of graphitization is preferably 1500 to 3200° C. When the temperature during graphitization is less than 1500° C., crystal growth may be hindered, crystallite length may be insufficient, and conductivity may be significantly reduced. Further, when the graphitization temperature exceeds 3000° C., it is preferable in terms of crystal growth, but the oxygen content of the carbon fiber is likely to decrease. The firing time is preferably 0.1 to 24 hours, and more preferably 0.2 to 10 hours.

<Grinding Treatment>

The method for producing a carbon fiber aggregate of the present invention may include a grinding treatment step. The grinding treatment is preferably carried out in the thermoplastic resin removing step and/or the carbonizing and firing step. As the grinding method, it is preferable to apply a fine grinder such as a jet mill, a ball mill, a bead mill, an impeller mill, or a cutter mill, and after grinding, classification may be carried out as necessary. In the case of wet grinding, a dispersion medium is removed after grinding, but when marked secondary aggregation occurs at this time, subsequent handling is very difficult. In this case, it is preferable to carry out a crushing operation using a ball mill, a jet mill, or the like after drying.

2. Electrode Mixture Layer for Non-Aqueous Secondary Batteries

The second invention is an electrode mixture layer for a nonaqueous electrolyte secondary battery using the carbon fiber aggregate (hereinafter, also simply referred to as "electrode mixture layer"). The electrode mixture layer contains an electrode active material, the above-mentioned carbon fiber aggregate of the present invention, and preferably a binder. The electrode mixture layer of the present invention may further contain another carbon-based conductive auxiliary agent.

In the electrode mixture layer of the present invention, the carbon fiber constituting the carbon fiber aggregate of the present invention is usually dispersed in the electrode active material. Then, a plurality of carbon fibers are randomly dispersed three-dimensionally in the electrode mixture layer. In such dispersed carbon fibers, the carbon fibers are in contact with each other and also in contact with the electrode active material, and form a conductive path penetrating the film thickness direction of the electrode mixture layer.

The thickness (film thickness) of the electrode mixture layer of the present invention is not particularly limited, but is preferably 50 μm or more, more preferably 70 μm or more, further preferably 80 μm or more, and particularly preferably 100 μm or more. The upper limit of the film thickness is not particularly limited, but is preferably 1000 μm or less, more preferably less than 1000 μm, and particularly preferably less than 800 μm. When the film thickness is less than 50 μm, in the case of producing a cell having an arbitrary capacity, the volume occupancy of a separator and a current collector in the cell increases and the volume occupancy of the electrode mixture layer in the cell decreases. It is not preferable from the viewpoint of energy density, and its use is considerably limited. When the film thickness is 1000 μm or more, cracks are likely to occur in the electrode mixture layer, which is relatively difficult to produce. Further, when the film thickness is 1000 μm or more, transport of Li ions is likely to be inhibited and resistance is likely to increase. The method for measuring the film thickness of the electrode mixture layer is not particularly limited, but it may be measured using, for example, a micrometer.

A nonaqueous electrolyte secondary battery produced by using the electrode mixture layer of the present invention includes a lithium ion secondary battery as a typical battery. Hereinafter, the positive electrode active material and the negative electrode active material used in the lithium ion secondary battery will be described.

<Positive Electrode Active Material>

As the positive electrode active material contained in the electrode mixture layer of the present invention, any one or more may be appropriately selected from conventionally known materials known as positive electrode active materials in the nonaqueous electrolyte secondary battery, and used. For example, in the case of a lithium ion secondary battery, a lithium-containing metal oxide capable of storing and releasing lithium ions is suitable. The lithium-containing metal oxide includes composite oxides containing lithium and at least one element selected from the group consisting of Co, Mg, Mn, Ni, Fe, Al, Mo, V, W, Ti, and the like.

Specific examples include at least one selected from the group consisting of $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, $Li_xMn_cFe_{2-c}O_4$, (wherein, x=0.02 to 1.2, a=0.1 to 0.9, b=0.8 to 0.98, c=1.2 to 1.96, z=2.01 to 2.3.), $LiFePO_4$, and the like. Preferred lithium-containing metal oxides include at least one selected from the group consisting of $Li_xCoO_2$, $Li_xNiO_2$, $Li_xMnO_2$, $Li_xCo_aNi_{1-a}O_2$, $Li_xMn_2O_4$, and $Li_xCo_bV_{1-b}O_z$ (wherein, x, a, b, and z are the same as above.). It is to be noted that the value of x is a value before the start of charge/discharge, which is increased or decreased by charge/discharge.

The positive electrode active material may be used alone or in combination of two or more. Moreover, the average particle size of the positive electrode active material is preferably 10 μm or less, more preferably 0.05 to 7 μm, and further preferably 1 to 7 μm. When the average particle size exceeds 10 μm, the efficiency of charge/discharge reaction under a large-current condition may be decreased in some cases.

The content of the positive electrode active material in the electrode mixture layer of the present invention is preferably 60% by mass or more, more preferably 70 to 98.5% by mass, and further preferably 75 to 98.5% by mass. When it is less than 60% by mass, it may be difficult to apply it to power supply applications that require high energy density. When it exceeds 98.5% by mass, the amount of binder is too small so that cracks may occur in the electrode mixture layer, or the electrode mixture layer may peel off from the current collector. Further, the content of the carbon fiber or the carbon-based conductive auxiliary agent may be too small so that the conductivity of the electrode mixture layer may be insufficient.

<Negative Electrode Active Material>

As the negative electrode active material contained in the electrode mixture layer of the present invention, any one or more may be appropriately selected from conventionally known materials known as negative electrode active materials in the nonaqueous electrolyte secondary battery, and used. For example, as a material capable of storing and releasing lithium ions, a carbon material, either of Si and Sn, or an alloy or oxide containing at least one of these and the like may be used. Among these, a carbon material is preferable from the viewpoint of cost and the like. Examples of the carbon material include natural graphite, artificial graphite produced by heat-treating petroleum-based or coal-based coke, hard carbon obtained by carbonizing a resin, mesophase pitch-based carbon materials, and the like.

When natural graphite or artificial graphite is used, it is preferable that surface spacing d (002) of the (002) plane of the graphite structure by powder X-ray diffraction is in the range of 0.335 to 0.337 nm from the viewpoint of increasing battery capacity. Natural graphite means a graphite material produced naturally as ore. Natural graphite is classified into two types, scaly graphite having a high degree of crystallinity and earthy graphite having a low degree of crystallinity, depending on appearance and properties thereof. Scaly graphite is further classified into flaky graphite having a leaf-like appearance and massive scaly graphite. An origin, properties, and the type of natural graphite as a graphite material are not particularly limited. Further, natural graphite or particles produced from natural graphite as a raw material may be subjected to heat treatment and used.

Artificial graphite refers to graphite widely made by artificial techniques, and a graphitic material close to perfect crystals of graphite. Typical examples thereof include graphite obtained by subjecting tar and coke obtained from residues by dry distillation of coal or distillation of crude oil and the like, as raw materials, through a firing step at about 500 to 1000° C. and a graphitization step at 2000° C. or more. In addition, kish graphite obtained by reprecipitation of carbon from dissolved iron is also a kind of artificial graphite.

Use of an alloy containing at least one of Si and Sn in addition to the carbon material as the negative electrode active material is effective in that electric capacity can be reduced, as compared with a case of using each of Si and Sn as a single substance or a case of using an oxide for each of Si and Sn. Among these, Si-based alloys are preferable. The Si-based alloy includes alloys of at least one element selected from the group consisting of B, Mg, Ca, Ti, Fe, Co, Mo, Cr, V, W, Ni, Mn, Zn, Cu, and the like, with Si, and the like. Specifically, the alloys include at least one selected from the group consisting of $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $VSi_2$, $WSi_2$, $ZnSi_2$, and the like.

In the electrode mixture layer of the present invention, as the negative electrode active material, one of the already mentioned materials may be used alone, or two or more thereof may be used in combination. In addition, the average particle size of the negative electrode active material is made 10 μm or less. When the average particle size exceeds 10 μm, the efficiency of charge/discharge reaction under a large-current condition will be decreased. The average particle size is preferably 0.1 to 10 μm, and more preferably 1 to 7 μm.

<Binder>

As a binder for use in the electrode mixture layer of the present invention, any binder can be used, as long as the binder is capable of electrode formation, with sufficient electrochemical stability. It is preferable to use, as the binder, one or more selected from the group consisting of polyvinyl alcohol, polyacrylic acid, carboxymethyl cellulose, polytetrafluoroethylene (PTFE), polyvinylidene fluoride (PVDF), styrene butadiene rubber (SBR), crosslinked fluoroolefin copolymer, polyimide, polyamideimide, aramid, phenol resin, and the like, and in particular, polyvinylidene fluoride (PVDF) is preferable. The form for use as a binder is not particularly restricted, may be a solid form or a liquid form (for example, an emulsion), and may be appropriately selected in consideration of the method for manufacturing an electrode (in particular, dry kneading or wet kneading), dissolution in an electrolytic solution, and the like.

The content of the binder in the electrode mixture layer of the present invention is preferably 1 to 25% by mass, more preferably 3 to 15% by mass, and further preferably 5 to 10% by mass. When the content is less than 1% by mass, cracks may occur in the electrode mixture layer, or the electrode mixture layer may be peeled off from the current collector. When the content exceeds 25% by mass, the amount of the active material in the electrode is reduced, and the energy density of the battery obtained is likely to decrease.

(Carbon-Based Conductive Auxiliary Agent Other than Carbon Fiber Aggregate of Present Invention)

The electrode mixture layer of the present invention may also contain a carbon-based conductive auxiliary agent, besides the present carbon fiber aggregate. Examples of the carbon-based conductive auxiliary agent other than the present carbon fiber aggregate include carbon black, acetylene black, carbon nanotube, VGCF, flaky carbon, graphene, and graphite. These carbon-based conductive auxiliary agents may be used alone, or two or more thereof may be used in combination.

The shape of these carbon-based conductive auxiliary agents is not particularly limited, but is preferably particulate. The average particle size (primary particle size) of the carbon-based conductive auxiliary agent is preferably 10 to 200 nm, and more preferably 20 to 100 nm. The aspect ratio of these carbon-based conductive auxiliary agents is 10 or less, preferably 1.0 to 5.0, and more preferably 1.0 to 3.0.

The content of the carbon-based conductive auxiliary agent other than the carbon fibers in the electrode mixture layer of the present invention is preferably 0.5 to 5% by mass, more preferably 0.5 to 4% by mass, and further preferably 1 to 3% by mass.

As a method for producing the electrode mixture layer, for example, a slurry in which the above-mentioned electrode active material, carbon fibers, and solvent are mixed is prepared. The electrode mixture layer may be produced by adhering this slurry to a base material by application or the like, then drying and removing the solvent, performing pressure molding by pressing, and peeling off the base material if necessary. Alternatively, the electrode mixture layer may be produced by powder mixing of the above-mentioned positive electrode active material and carbon fibers, followed by performing pressure molding by pressing.

EXAMPLES

Hereinafter, the present invention will be further specifically described by way of examples, but the present invention is not limited to these examples. Various measurements and analyses in examples were performed in accordance with the following methods, respectively.

(1) Confirmation of Shape of Carbon Fiber

Observation and photographing were performed using a desk-top electron microscope (manufactured by JEOL Ltd., model: NeoScope JCM-6000). The average fiber diameter of carbon fibers was determined by measuring fiber diameters at 300 spots randomly selected in the obtained electron micrograph, and calculating the average value of all the measurement results thereof (n=300). The average fiber length was measured in the same manner.

(2) X-Ray Diffraction Measurement of Carbon Fiber

In X-ray diffraction measurement, lattice spacing (d002) and crystallite size (Lc) were measured in accordance with the JIS R 7651 method using RINT-2100 manufactured by Rigaku Corporation.

(3) Measurement of Tap Density

A carbon fiber aggregate was passed through a sieve with a mesh opening of 1 mm, and then placed in a glass graduated cylinder with an inner diameter of 31 mm and a capacity of 150 ml, and taps were performed with the tap density measuring machine (TSUTSUI SCIENTIFIC INSTRUMENTS CO., LTD., TPM-1A) under conditions of a tap speed of 40 times/minute, a tap stroke range of 60 mm, and a tap count of 500 times to measure a tap density.

(4) Density Measurement of Positive Electrode Mixture Layer Under Pressure

The carbon fiber aggregate and a positive electrode active material were powder-mixed under drying to obtain a powder mixture. Next, the powder mixture whose mass was measured in advance was put into a cylindrical cylinder with a diameter of 20 mm, and the powder mixture was compressed by a piston equipped with a load measuring device. By measuring a gap between a piston and a bottom surface of the cylinder at that time, the density of the powder mixture (positive electrode mixture layer) under pressure was calculated. (Powder resistivity measurement system MCP-PD51, manufactured by Mitsubishi Chemical Analytech Co., Ltd, was used)

Reference Example 1 Method for Producing Mesophase Pitch

A coal tar pitch freed of a quinoline-insoluble component and with a softening point of 80° C. was hydrogenated at a pressure of 13 MPa and a temperature of 340° C. in the presence of a Ni—Mo based catalyst to obtain a hydrogenated coal tar pitch. The hydrogenated coal tar pitch was heat-treated at 480° C. under atmospheric pressure and then decompressed to remove a low-boiling-point component to obtain a mesophase pitch. The mesophase pitch was filtered using a filter at a temperature of 340° C., and foreign matters in the pitch were removed to obtain a purified mesophase pitch.

Example 1

60 Parts by mass of linear low-density polyethylene (EXCEED (registered trademark) 1018HA, manufactured by Exxon Mobil Corporation, MFR=1 g/10 min) as a thermoplastic resin and 40 parts by mass of the mesophase pitch (mesophase ratio 90.9%, softening point 303.5° C.) obtained in Reference Example 1 were melt-kneaded with a same direction twin-screw extruder ("TEM-26SS" manufactured by Toshiba Machine Co., Ltd., barrel temperature 300° C., under nitrogen stream) to prepare a mesophase pitch composition. Here, the average dispersion diameter of the mesophase pitch in the polyethylene was 2.8 µm, and the standard deviation was 2.6 µm. The average dispersion diameter was determined by measuring the dispersion diameters at 200 points randomly selected in the fluorescence micrograph by observing the mesophase pitch composition with a fluorescence microscope, and calculating the average value of all the measurement results thereof (n=200).

Next, the mesophase pitch composition was formed into long fibers with a fiber diameter of 90 µm by a melt spinning machine using a circular spinneret with a diameter of 0.2 mm and an introduction angle of 60°. The spinneret temperature was 360° C., the discharge amount per spinning hole was 16.8 g/spinneret/hr, and the draft ratio, which is the ratio of the discharge line speed to the take-up speed, was 5.

A reaction was performed for 100 minutes using 0.1 kg of the mesophase pitch-containing fiber bundle obtained by the above operation, by setting at a temperature of 100° C. and a molar ratio of nitrogen dioxide to oxygen ($NO_2/O_2$) in a reactive gas of 0.61 by a circulation method. The circulation speed of nitrogen dioxide and oxygen was set to 0.4 m/s. As a result, the mesophase pitch was stabilized and a stabilized mesophase pitch-containing fiber bundle was obtained. The stabilized mesophase pitch-containing fiber bundle was depressurized to 1 kPa after nitrogen replacement in a vacuum gas replacement furnace, and under the depressurized state, the temperature was raised to 500° C. at a heating rate of 5° C./min and held at 500° C. for 1 hour, whereby the thermoplastic resin was removed to obtain a stabilized fiber.

Then, the stabilized fiber was held at 1000° C. for 30 minutes in a nitrogen atmosphere for carbonization, further heated to 1750° C. in an argon atmosphere and held for 30 minutes for graphitization.

Subsequently, the graphitized carbon fiber aggregate was pulverized with an air jet mill ("Super Jet Mill, SJ-1500" manufactured by Nisshin Engineering Inc.) to obtain a powdery carbon fiber aggregate. The carbon fiber had a linear structure without branching (degree of branching 0).

The average fiber diameter of the obtained carbon fiber aggregate was 260 nm, the CV value of the fiber diameter was 0.55, the average fiber length was 13.5 µm, the CV value of the fiber length was 1.2, and the tap density was 0.036. The bulk density measured in a pressurized state at a pressure of 3 kg/cm² was 0.388 g/cm³, which was 10.8 times the tap density. The bulk density measured in a pressurized state at a pressure of 1.5 kg/cm² was 0.321 g/cm³, which was 8.9 times the tap density.

Furthermore, powder volume resistivity A when packed with a packing density of 1.5 g/cm³ was 0.008 (Ω·cm), powder volume resistivity B when packed with a packing density of 0.5 g/cm² was 0.063 (Ω·cm), and A/B was 12.7%. Also, d002, which indicates the degree of crystallinity, was 0.3432 nm, and Lc was 11.3 nm.

Further, 2 parts by mass of the obtained carbon fiber aggregate and 91 parts by mass of lithium iron phosphate (manufactured by TATUNG FINE CHEMICALS CO., Model P13f) were powder-mixed under drying to prepare an electrode (positive electrode) mixture layer of a lithium ion battery, and the density of this electrode mixture layer under pressure was measured. The density of the electrode mixture layer when compressed at 10 MPa was 1.60 g/cm².

Comparative Example 1

80 Parts by mass of linear low-density polyethylene (EVOLUE (registered trademark) SP-1510, manufactured by Prime Polymer Co., Ltd., MFR=1 g/10 min) as a thermoplastic resin and 20 parts by mass of the mesophase pitch (mesophase ratio 90.9%, softening point 303.5° C.) obtained in Reference Example 1 were melt-kneaded with a same direction twin-screw extruder ("TEM-26SS" manufactured by Toshiba Machine Co., Ltd., barrel temperature 270° C., under nitrogen stream) to prepare a mesophase pitch composition. Here, the average dispersion diameter of the mesophase pitch in the polyethylene was 2.0 µm, and the standard deviation was 0.9 µm. The average dispersion diameter was determined by measuring the dispersion diameters at 200 points randomly selected in the fluorescence micrograph by observing the mesophase pitch composition with a fluorescence microscope, and calculating the average value of all the measurement results thereof (n=200).

Next, the mesophase pitch composition was formed into long fibers with a fiber diameter of 115 Um by a melt spinning machine using a circular spinneret with a diameter of 0.2 mm and an introduction angle of 60°. The spinneret temperature was 330° C., the discharge amount per spinning hole was 4.1 g/spinneret/hr, and the draft ratio, which is the ratio of the discharge line speed to the take-up speed, was 3.

A reaction was performed for 100 minutes using 0.1 kg of the mesophase pitch-containing fiber bundle obtained by the above operation, by setting at a temperature of 100° C. and a molar ratio of nitrogen dioxide to oxygen ($NO_2/O_2$) in a reactive gas of 0.61 by a circulation method. The circulation speed of nitrogen dioxide and oxygen was set to 0.4 m/s. As a result, the mesophase pitch was stabilized and a stabilized mesophase pitch-containing fiber bundle was obtained. The stabilized mesophase pitch-containing fiber bundle was depressurized to 1 kPa after nitrogen replacement in a vacuum gas replacement furnace, and under the depressurized state, the temperature was raised to 500° C. at a heating rate of 5° C./min and held at 500° C. for 1 hour, whereby the thermoplastic resin was removed to obtain a stabilized fiber.

Then, the stabilized fiber was held at 1000° C. for 30 minutes in a nitrogen atmosphere for carbonization, further heated to 1750° C. in an argon atmosphere and held for 30 minutes for graphitization.

Subsequently, the graphitized carbon fiber aggregate was pulverized with an air jet mill ("Super Jet Mill, SJ-1500" manufactured by Nisshin Engineering Inc.) to obtain a powdery carbon fiber aggregate. The carbon fiber had a linear structure without branching (degree of branching 0).

The average fiber diameter of the obtained carbon fiber aggregate was 260 nm, the CV value of the fiber diameter was 0.36, the average fiber length was 16.9 μm, the CV value of the fiber length was 1.3, and the tap density was 0.017. The bulk density measured in a pressurized state at a pressure of 3 kg/cm² was 0.354 g/cm³, which was 20.8 times the tap density. The bulk density measured in a pressurized state at a pressure of 1.5 kg/cm² was 0.289 g/cm³, which was 17.0 times the tap density.

Furthermore, powder volume resistivity A when packed with a packing density of 1.5 g/cm³ was 0.010 (Ω·cm), powder volume resistivity B when packed with a packing density of 0.5 g/cm³ was 0.081 (Ω·cm), and A/B was 12.3%.

Also, d002, which indicates the degree of crystallinity, was 0.3433 nm, and Lc was 9.2 nm.

Further, 2 parts by mass of the obtained carbon fiber aggregate and 91 parts by mass of lithium iron phosphate (manufactured by TATUNG FINE CHEMICALS CO., Model P13f) were powder-mixed under drying to prepare an electrode (positive electrode) mixture layer of a lithium ion battery, and the density of this electrode mixture layer under pressure was measured. The density of the electrode mixture layer when compressed at 10 MPa was 1.57 g/cm³.

Examples 2 to 4

A carbon fiber aggregate was obtained in the same manner as in Example 1 except that the charge amount (composition ratio) of the linear low-density polyethylene and the mesophase pitch was changed as shown in Table 1. The results are shown in Table 1.

Comparative Example 2

A carbon fiber aggregate was obtained in the same manner as in Comparative Example 1 except that the charge amount (composition ratio) of the linear low-density polyethylene and the mesophase pitch was changed as shown in Table 1. The results are shown in Table 1.

The numerical values of Examples and Comparative Examples described above are summarized in Table 1 below. In addition, the conditions of the production method in Examples and Comparative Examples described above are summarized in Table 1 below. In any carbon fiber aggregate, the total content of metal elements (Li, Na, Ti, Mn, Fe, Ni, and Co) was 20 ppm or less, and the boron content was 1 mass ppm or less.

TABLE 1

| | Example 1 | Example2 | Example3 | Example4 | Comparative Example 1 | Comparative Example 2 |
|---|---|---|---|---|---|---|
| Composition ratio (floss basis) of polyethylene and mesophase pitch | 60:40 | 64:36 | 56:44 | 50:50 | 30:20 | 90:10 |
| Barre temperature (° C.) | 300 | 300 | 300 | 300 | 270 | 270 |
| Average dispersion diameter of mesophase pitch in polyethylene (μm) | 2.8 | 2.8 | 2.8 | 2.8 | 2 | 2 |
| Standard deviation (μm) | 2.6 | 2.6 | 2.6 | 2.6 | 0.9 | 0.9 |
| Fiber diameter (μm) | 90 | 90 | 90 | 90 | 115 | 115 |
| Spinneret temperature (° C.) | 360 | 300 | 360 | 360 | 330 | 330 |
| Discharge amount per spinning hole (g/spinneret/hr) | 16.8 | 16.6 | 17.1 | 17.5 | 4.1 | 4.14 |
| Draft ratio, which is ratio of discharge line speed to take-up speed | 5 | 5 | 5 | 5 | 3 | 3 |
| Average fiber diameter (nm) | 260 | 290 | 330 | 340 | 260 | 260 |
| Coefficient of variation (CV value) of fiber diameter | 0.55 | 0.51 | 0.54 | 0.75 | 0.36 | 0.34 |
| Average fiber length | 13.5 | 13.9 | 14.3 | 13.8 | 16.9 | 17.1 |
| Coefficient of variation (CV value) of fiber length | 1.2 | 1.2 | 1.1 | 1.1 | 1.3 | 1.3 |
| Tap density P (d/cm³) | 0.036 | 0.032 | 0.057 | 0.077 | 0.017 | 0.016 |
| Bulk density measured in pressurized state at pressure of 3.0 kg/cm (g/cm³) | 0.338 | 0.382 | 0.404 | 0.480 | 0.354 | 0.343 |
| Q/P | 10.8 | 11.9 | 7.1 | 6.2 | 20.8 | 21.4 |
| Powder volume resistivity A (Ω · cm) when packed with a packing density of 1.5 g/cm³ | 0.008 | 0.008 | 0.007 | 0.008 | 0.010 | 0.011 |
| Powder volume resistivity B (Ω · cm) when packed with a packing density of 0.50 g/cm³ | 0.063 | 0.079 | 0.061 | 0.090 | 0.081 | 0.100 |
| A/B (%) | 12.7 | 10.1 | 11.5 | 8.9 | 12.3 | 11.1 |
| Bulk density measured in pressurized state at pressure of 1.5 kg/cm² (g/cm³) | 0.321 | 0.318 | 0.338 | 0.410 | 0.289 | 0.278 |

TABLE 1-continued

|  | Example 1 | Example2 | Example3 | Example4 | Comparative Example 1 | Comparative Example 2 |
|---|---|---|---|---|---|---|
| R/P | 8.9 | 9.9 | 5.9 | 5.3 | 17.0 | 17.4 |
| d002 (nm) | 0.3432 | 0.3432 | 0.3431 | 0.3433 | 0.3433 | 0.3434 |
| Lc (nm) | 11.3 | 11.7 | 11.5 | 10.8 | 9.2 | 10.9 |
| Density of electrode mixture layer (q/cm$^3$) | 1.60 | 1.58 | 1.60 | 1.59 | 1.57 | 1.57 |

Based on Examples and Comparative Examples described above, the electrode mixture layer containing the carbon fiber aggregate of the present invention has a high electrode density. It is presumed that since the carbon fiber aggregate is efficiently arranged in gaps formed by the active material particles, the electrode mixture layer can contain more active material particles and is packed at high density.

The invention claimed is:

1. A carbon fiber aggregate with an average fiber diameter of 100 to 1000 nm, an average fiber length of 10 to 30 μm, and a coefficient of variation (CV value) of the fiber diameter of greater than 0.50 and 1.0 or less.

2. The carbon fiber aggregate according to claim 1, wherein the carbon fiber aggregate has a crystallite spacing (d002) in accordance with an X-ray diffraction method of 0.3400 nm or more.

3. The carbon fiber aggregate according to claim 1, which has a tap density of 0.020 to 0.100 g/cm$^3$.

4. The carbon fiber aggregate according to claim 3, wherein a bulk density measured in a pressurized state at a pressure of 3.0 kg/cm$^2$ is 5.0 to 30 times the tap density.

5. The carbon fiber aggregate according to claim 1, wherein powder volume resistivity A (Ω·cm) when packed with a packing density of 1.5 g/cm$^3$ is 7.0 to 20% of powder volume resistivity B (Ω·cm) when packed with a packing density of 0.50 g/cm$^3$.

6. The carbon fiber aggregate according to claim 3, wherein a bulk density measured in a pressurized state at a pressure of 1.5 kg/cm$^2$ is 2.0 to 15 times the tap density.

7. An electrode mixture layer for a nonaqueous electrolyte secondary battery, comprising:
the carbon fiber aggregate according to claim 1; and an electrode active material.

8. A method for producing the carbon fiber aggregate according to claim 1, comprising:
(1) a fiberizing step of forming a resin composition composed of a thermoplastic resin and 30 to 150 parts by mass of a mesophase pitch based on 100 parts by mass of the thermoplastic resin, in a molten state, thereby fiberizing the mesophase pitch to obtain a resin composite fiber;
(2) a stabilizing step of stabilizing the resin composite fiber to obtain a resin composite stabilized fiber;
(3) a thermoplastic resin removing step of removing the thermoplastic resin from the resin composite stabilized fiber to obtain a stabilized fiber; and
(4) a carbonizing and firing step of heating the stabilized fiber under an inert atmosphere for carbonization or graphitization to obtain a carbon fiber aggregate.

9. The carbon fiber aggregate according to claim 2, which has a tap density of 0.020 to 0.100 g/cm$^3$.

10. The carbon fiber aggregate according to claim 9, wherein a bulk density measured in a pressurized state at a pressure of 3.0 kg/cm$^2$ is 5.0 to 30 times the tap density.

11. The carbon fiber aggregate according to claim 9, wherein a bulk density measured in a pressurized state at a pressure of 1.5 kg/cm$^2$ is 2.0 to 15 times the tap density.

* * * * *